United States Patent Office 3,427,133
Patented Feb. 11, 1969

3,427,133
PROCESS FOR PRODUCING TRANS-
DIFLUORODIAZINE
Gerald L. Hurst, West Covina, Calif., and Saadideen I.
Khayat, Cleveland, Ohio, assignors to Kewanee Oil
Company, Bryn Mawr, Pa., a corporation of Delaware
No Drawing. Filed Mar. 29, 1966, Ser. No. 538,236
U.S. Cl. 23—205  6 Claims
Int. Cl. C01b 21/52

ABSTRACT OF THE DISCLOSURE

This invention comprises a process for the preparation of a trans-difluorodiazine (trans-$N_2F_2$) wherein tetrafluorohydrazine ($N_2F_4$) is reacted under carefully controlled conditions, including temperature, pressure and reaction time, with anhydrous $AlCl_3$, $FeCl_3$, $FeSO_4$, $MnCl_2$, and $NiCl_2$. The reaction is preferably conducted at a temperature of $-112°$ C. to $30°$ C., a pressure of 10 mm. Hg to atmospheric, and a reaction period of not more than one minute.

---

This invention relates to an improved process for the preparation of trans-difluorodiazine (trans-$N_2F_2$) wherein tetrafluorohydrazine ($N_2F_4$) is contacted with an anhydrous salt of certain transition metals, or with activated anhydrous aluminum chloride. This reaction should be conducted under carefully determined process conditions, particularly with respect to temperature, pressure, and reaction time.

Difluorodiazine was first prepared by Haller (Ph. D. thesis, Cornell University, 1942) by the thermal decomposition of fluorine azide ($N_3F$). Other methods for preparing $N_2F_2$ have also been reported (see Hoffman and Neville, Chem. Rev. 62, page 1, 1962); but such processes produce a mixture of cis or trans-$N_2F_2$. For example, the electrolysis of molten ammonium bifluoride has been utilized and has made such a mixture. This process, as well as other known processes, has not been satisfactory in many respects. All have been inconvenient to work with, inefficient in that they produce a poor yield of $N_2F_2$, and in many instances have been dangerous. One difficulty arose as a result of the explosiveness of the cis isomer of $N_2F_2$. When cooled with liquid nitrogen to separate the $N_2F_2$ from the other gases resulting from the process of producing $N_2F_2$, the cis isomer tends to detonate. Thus other means of separation are necessary. Furthermore, the cis isomer once produced cannot be rearranged entirely to form the trans isomer, there being established a definite equilibrium. The cis form in the gaseous phase is not particularly dangerous, although it is very reactive.

Accordingly, one advantage of the present process lies in the production of the trans form, without measurable quantities of the cis form, so that the $N_2F_2$ can be readily separated from the other gases resulting from the reaction, by a cold trap, without risk of explosion. Also, the trans form can be put to various uses for which it is best suited as compared with the cis form, without the laborious and difficult task of separating these isomers. Such separation is not practicable and must be undertaken by chromatography or adduct-formation which present unnecessary difficulties for the production of workable quantities of the material. On the other hand, if cis-enriched $N_2F_2$ is desired, it can be produced from the trans form by a simple heating operation. For many purposes, it is not material which isomer is utilized but it is, of course, desirable to have a choice. Also, the process embodied in the present invention is superior to those in the prior art in providing a higher yield and in producing a purer product.

Difluorodiazine has been used as a polymerization catalyst, especially for the "Viton" fluoro-elastomers. $N_2F_2$ has also been used as an oxidizer in rocket propellants and is of considerable interest for use in fluorination reactions instead of fluorine itself. $N_2F_2$ is almost as reactive as fluorine and may possess some advantages in handling and in making possible the use of more convenient equipment and practical processes.

Inasmuch as the mechanism of the reaction resulting from the present process is not known with certainty, the following equations represent some reactions believed to be involved in this process, or which could be involved in it depending on various factors, such as temperature and pressure. These equations apply if aluminum chloride is used as the reacting agent.

(I)   $3N_2F_4 + 2AlCl_3 \rightarrow 3N_2F_2 + 3Cl_2 + 2AlF_3$ (II)  $3N_2F_4 + 4AlCl_3 \rightarrow 3N_2 + 6Cl_2 + 4AlF_3$ (III) 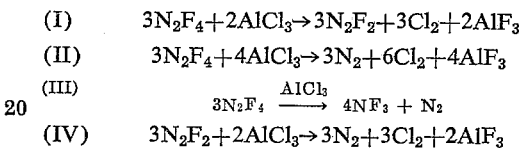

(IV)  $3N_2F_2 + 2AlCl_3 \rightarrow 3N_2 + 3Cl_2 + 2AlF_3$

From the above equations, it can be seen that the only desirable reaction for present purposes is that represented by Equation I. However, at room temperature and at atmospheric pressure, reaction I is accompanied by the formation of elemental nitrogen which, in fact, under these conditions accounts for most of the $N_2F_4$. As can be seen from Equation IV, the product trans-$N_2F_2$ is reduced by aluminum chloride, producing elemental nitrogen and chlorine, and Equations I to IV inclusive are quite vigorous at ambient temperatures. We have discovered that reactions III and IV can be inhibited effectively by carefully adjusting conditions of temperature and pressure. The rate of disproportionation of $N_2F_4$ in the presence of aluminum chloride (reaction III) is strongly pressure-dependent, becoming almost negligible at pressures below 20 mm. mercury. On the other hand, it is found that reaction IV is temperature-dependent, going very slowly at about $-78°$ C. or below. Thus, in spite of reaction II, we have found that at temperatures of about $-112°$ C. to about $-78°$ C. and pressures of 15 to 20 mm. mercury, trans-$N_2F_2$ is produced in a yield of approximately 50%.

At room temperature (about $30°$ C.) and atmospheric pressure, and assuming that aluminum chloride is utilized, it is possible to produce some trans-$N_2F_2$ but it is necessary, to conduct the reaction for a very short time; that is, from about 5 seconds to one minute. For longer reaction times, using aluminum chloride, most of the $N_2F_2$ seems to react further to produce elemental nitrogen, chlorine, and some aluminum fluoride. Thus, the yield of trans-$N_2F_2$ at these longer reaction times is largely reduced, but at the shorter reaction times, more may be made, and, as noted above, at the lower temperatures and pressures, the yield of $N_2F_2$ is considerably better.

Reaction II appears to accompany reaction I invariably; that is, even at the low temperatures and pressures mentioned above. Possibly reaction II produces the cis and trans isomers initially and the cis isomer reacts further in the presence of aluminum chloride to produce the elemental nitrogen and chlorine. This supposition is supported by the fact that the yield of trans-$N_2F_2$, according to the present process, does not appear to exceed approximately 50% under what are believed to be optimum conditions. However, reaction II may merely be predominant at room temperature and normal pressure. Whatever the reason may be, a yield of 50% trans-$N_2F_2$ is obtained as a result of operating the present process and is particularly notable as compared with the 5% to 10% yield of $N_2F_2$ obtained by former processes.

Depending upon the apparatus used, the process of this invention when aluminum chloride is used, can be carried out on a batch or a continuous flow basis without affecting the yield adversely. For small scale production, a convenient apparatus consists of a vacuum manifold equipped with conventional U-traps. The aluminum chloride is placed on the bottom of a U-trap and sublines on the walls by heating with a Bunsen burner. The aluminum chloride should be activated by keeping it in contact with a small amount of $N_2F_4$ for a period of about 30 minutes, at room temperature. The U-trap is then evacuated and cooled to $-78°$ C. with a carbon dioxide-acetone bath. The $N_2F_4$ is admitted to the U-trap at low pressures; that is, 15 to 20 mm. of mercury. This can be accomplished by either a flow meter or by keeping the $N_2F_4$ at about $-130°$ C., at which temperature the vapor pressure of $N_2F_4$ appears to be optimum, or by mixing the $N_2F_4$ with an inert gas. The resulting gases are trans-$N_2F_2$, chlorine, nitrogen, and traces of $NF_3$ and $N_2F_4$. Separation of these gases is accomplished by trap-to-trap vacuum distillation, or by other techniques known to those familiar with the art, such as chromatography. If an inert gas is used, the partial pressure of $N_2F_4$ may be kept at the optimum figure mentioned, or within a desired range, while the total pressure may be higher, thus avoiding the relatively high vacuum mentioned. Such a procedure may well be more convenient and may be followed without adversely affecting the yield of trans-$N_2F_2$ produced.

Anhydrous transition metal salts, in addition to $AlCl_3$, which have been used in the present process, include $FeCl_3$, $FeSO_4$, $MnCl_2$, and $NiCl_2$. These salts are considerably less reactive than $AlCl_3$ but can be used to produce a comparable yield of trans-$N_2F_2$, although it is necessary to make the runs at room temperature, and for much longer reaction times. In fact, hours to days were required in order to obtain results comparable to those secured by using $AlCl_3$ at a reaction time of seconds—usually about five seconds to one minute.

Of particular interest is anhydrous $NiCl_2$. In a period of two days at ambient temperature, 10 g. $NiCl_2$ reacted with 0.5 millimole of $N_2F_4$, giving 0.25 millimole of trans-$N_2F_2$ and chlorine. No nitrogen trifluoride was detected, however, indicating that the mechanism involved is different from that observed with $AlCl_3$. This is supported by the fact that $AlCl_3$ is known to be a disproportionation catalyst, thus giving rise to reaction III. Furthermore, trans-$N_2F_2$ is considerably less reactive with $NiCl_2$, which is evidenced by the long contact time without destruction of the diazine.

Since the contact time is so long on these transition metal salts, it will be appreciated that a suitable continuous flow process would be most difficult to devise and operate, and even a batch process would not be easy. It is believed, if $AlCl_3$ is used in the process of the present invention, the conversion is close to 100 percent; that is, virtually all of the $N_2F_4$ is reacted although only about half of it is converted to trans-$N_2F_2$ (50% yield). If the other transition metal salts mentioned above are used; while the yield is often much the same (50% or thereabouts) the conversion; that is, the percentage of $N_2F_4$ which reacts at all, is less. For example, if $NiCl_2$ is used, the conversion is about 60% to produce a 50% yield. Thus, in this instance, a higher percentage of the reaction products consisted of the product desired—trans-$N_2F_2$.

The following examples set forth certain well defined embodiments of this invention but are not to be considered as limitations thereof since modifications may be made without departing from the spirit and scope of the invention. Unless otherwise specified, all parts are by weight and all temperatures are in degrees centigrade.

EXAMPLE I 1.3 grams of anhydrous powdered aluminum chloride was placed in a Pyrex ampoule (135 ml.) equipped with a stopcock. The $AlCl_3$ was sublimed (requiring a temperature of about 200° C.) on to the walls of the ampoule and after cooling to room temperature a small amount of $N_2F_4$ (0.2 millimole) was admitted and let in contact with the salt for 30 minutes. The ampoule was evacuated to remove the nitrogen and chlorine formed. One millimole of $N_2F_4$ was added to the ampoule by distillation with liquid nitrogen ($-196°$ C.). The temperature of the ampoule was raised to $-78°$ C. by a $CO_2$-acetone bath and held at that temperature for one to five minutes, at a pressure of 15–20 mm. mercury. The gaseous products were passed through a series of three U-traps held at liquid nitrogen temperature. After the elementary nitrogen was removed by pumping, the products were fractionated from "pentane slush" at $-130°$ C. The product was further purified by washing with slightly basic solution to remove any trace of chlorine. Any carried-over tetrafluorohydrazine was removed by shaking the gases with traces of nitric oxide. The product is passed through $CO_2$-acetone bath to remove water vapor. The final analysis showed 0.5 millimole of trans-$N_2F_2$, 0.3 millimole of $NF_3$ the only impurity observed.

EXAMPLE II 120 millimoles of $N_2F_4$ were condensed in a U-trap leading to a series of four U-traps. A n-pentane slush bath was placed around the trap containing the $N_2F_4$. The gas at a vapor pressure of 12 mm. mercury was passed over 27 g. of $AlCl_3$ previously sublimed and activated as in Example I. Analysis trans-$N_2F_2$, 59.7 millimoles; $Fe_3$, 0.4 millimole.

EXAMPLE III 10 g. of anhydrous $NiCl_2$ was placed in a glass ampoule as in Example I. 0.76 millimole of $N_2F_4$ was introduced into ampoule and let stand in contact with the salt for 65 hours at ambient temperature. Products analysis showed trans-$N_2F_2$ 0.38 millimole, $N_2$, $Cl_2$, and traces of HCl, $N_2O$, $SiF_4$, and $NF_2Cl$.

The invention claimed is:

1. A process for the preparation of trans-difluorodiazine comprising contacting tetrafluorohydrazine with an anhydrous metallic salt selected from the group consisting of $AlCl_3$, $FeCl_3$, $FeSO_4$, $MnCl_2$, $NiCl_2$ 2. A process as set forth in claim 1 in which the anhydrous salt is $AlCl_3$.

3. A process as set forth in claim 1 in which the anhydrous salt is $NiCl_2$.

4. A process as set forth in claim 2 in which the reaction temperature is $-112°$ C. to 30° C., the reaction pressure is 10 mm. Hg to atmospheric, and the contact time between the $AlCl_3$ and the $N_2F_4$ is not substantially longer than one minute.

5. A process as set forth is claim 2 in which the reaction temperature is about $-70°$ C.$^{+-}$ and the reaction pressure 10–15 mm. Hg, thereby to produce a yield of $N_2F_2$ of about 50%.

6. A process as set forth in claim 3 in which the reaction temperature is room temperature and the reaction time is about 15 to 75 hours, thereby to produce a yield of $N_2F_2$ of about 50%.

References Cited

UNITED STATES PATENTS

| | | | |
|---|---|---|---|
| 2,972,519 | 2/1961 | Lipscomb | 23—205 |
| 3,055,740 | 9/1962 | Sausen | 23—205 |
| 3,033,771 | 5/1962 | Frazer | 204—177 |

OTHER REFERENCES

Supplement to Mellor's Comprehensive Treatise on Inorganic and Theoretical Chemistry, Supplement II, Part I, pp. 62 and 121, Longmans, Green and Co., London, 1956.

OSCAR R. VERTIZ, *Primary Examiner.*

G. PETERS, *Assistant Examiner.*

UNITED STATES PATENT OFFICE

CERTIFICATE OF CORRECTION

Patent No. 3,427,133                                            February 11, 1969

Gerald L. Hurst et al.

It is certified that error appears in the above identified patent and that said Letters Patent are hereby corrected as shown below:

Column 3, line 1, after "invention" insert -- at least --; line 5, "sublines" should read -- sublimes --. Column 4, line 29, "$Fe_3$" should read -- $NF_3$ --.

Signed and sealed this 24th day of March 1970.

(SEAL)
Attest:

Edward M. Fletcher, Jr.                       WILLIAM E. SCHUYLER, JR.

Attesting Officer                                        Commissioner of Patents